(12) United States Patent
Nakajima et al.

(10) Patent No.: US 8,495,071 B1
(45) Date of Patent: Jul. 23, 2013

(54) USER PRODUCTIVITY BY SHOWING MOST VIEWED MESSAGES

(75) Inventors: Kaisuke Nakajima, San Jose, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/359,465

(22) Filed: Jan. 26, 2012

(51) Int. Cl.
*G06F 17/30* (2006.01)

(52) U.S. Cl.
USPC .......................................... 707/752; 707/753

(58) Field of Classification Search
USPC .................................................. 707/752, 753
See application file for complete search history.

(56) References Cited

U.S. PATENT DOCUMENTS

| | | | | |
|---|---|---|---|---|
| 6,202,058 | B1 * | 3/2001 | Rose et al. ........................ | 706/45 |
| 2006/0235933 | A1 * | 10/2006 | Baluja et al. .................. | 709/207 |
| 2011/0087969 | A1 * | 4/2011 | Hein et al. ..................... | 715/752 |
| 2011/0191768 | A1 * | 8/2011 | Smith ............................ | 717/176 |
| 2012/0084153 | A1 * | 4/2012 | Moreau et al. .............. | 705/14.66 |
| 2012/0150978 | A1 * | 6/2012 | Monaco et al. ............... | 709/206 |
| 2012/0150979 | A1 * | 6/2012 | Monaco ........................ | 709/206 |

* cited by examiner

*Primary Examiner* — Baoquoc N To (74) *Attorney, Agent, or Firm* — McDermott Will & Emery LLP (57) ABSTRACT

A computer-implemented method is provided, according to which, an indication of a plurality of attributes of user interaction with one or more electronic messages in a user account is received, a rank value for each of the one or more electronic messages based on the plurality of attributes of user interaction with the one or more electronic messages is determined, the one or more electronic messages in the user account based on the determined rank value are sorted, and the sorted one or more electronic messages are provided for display in accordance with the determined rank value.

24 Claims, 4 Drawing Sheets

FIG. 1

| 210 | 212 | 214 | 216 | 218 | 220 |
|---|---|---|---|---|---|
| Sender ID | Thread ID | Email ID | View Count | View Time | Action |
| John.Doe | 987654321 | 123456 | 15 | 326 | 24 |
| Jill.Doe | 654987321 | 456789 | 1 | 5 | 0 |
| Jack.Doe | 321987654 | 345678 | 1 | 12 | 1 |
| Jane.Doe | 654321987 | 234567 | 10 | 254 | 19 |

FIG. 2A

| 210 | 212 | 214 | 216 | 218 | 220 | 222 | 224 | 226 |
|---|---|---|---|---|---|---|---|---|
| Sender ID | Thread ID | Email ID | View Count | View Time | Action | Adjusted View Time | Adjusted Action | View Likelihood Score |
| John.Doe | 987654321 | 123456 | 15 | 326 | 24 | long | high | 0.95 |
| Jill.Doe | 654987321 | 456789 | 1 | 5 | 0 | short | low | 0.01 |
| Jack.Doe | 321987654 | 345678 | 1 | 12 | 1 | short | low | 0.33 |
| Jane.Doe | 654321987 | 234567 | 10 | 254 | 19 | medium | medium | 0.75 |

FIG. 2B

| 210 | 212 | 214 | 216 | 218 | 220 | 222 | 224 | 226 | 228 |
|---|---|---|---|---|---|---|---|---|---|
| Sender ID | Thread ID | Email ID | View Count | View Time | Action | Adjusted View Time | Adjusted Action | View Likelihood Score | Most Viewed Count |
| John.Doe | 987654321 | 123456 | 15 | 326 | 24 | long | high | 0.95 | +3 |
| Jane.Doe | 654321987 | 234567 | 10 | 254 | 19 | medium | medium | 0.75 | +1 |

USER PRODUCTIVITY BY SHOWING MOST VIEWED MESSAGES

TECHNICAL FIELD

The subject disclosure generally relates to electronic communications, and in particular, to sorting electronic messages.

BACKGROUND

Users may receive hundreds of electronic messages (e.g., emails) daily. Thus, it may be difficult to sort through all of the received electronic messages to find a particular electronic message. Some users may search for the same electronic message over and over again and spend extended periods of time trying to find a particular electronic message by date, key word, sender or another identifier. Some electronic message systems provide folders, into which electronic messages relating to a common topic, sender, event or other classification may be placed. Other electronic message systems offer labels or flags that may be used to help organize electronic messages or categorize a certain electronic message as "important" based on content, sender, subject or other message parameters, and set aside a copy of that electronic message in a separate folder or otherwise flag it for the user. However, none of the currently available mechanisms provides for an easy and efficient way for users to find and view frequently accessed electronic messages.

SUMMARY

The disclosed subject matter relates to a computer-implemented method for sorting electronic messages. According to one aspect of the disclosed technology, the computer-implemented method includes receiving an indication of a plurality of attributes of user interaction with one or more electronic messages in a user account. A rank value is then determined for each of the one or more electronic messages based on the plurality of attributes of user interaction with the one or more electronic messages and the one or more electronic messages in the user account are then sorted based on the determined rank value. The one or more electronic messages are provided for display in accordance with the determined rank value.

According to another aspect, the subject technology provides for receiving an indication of a plurality of attributes of user interaction with one or more electronic messages in a user account, determining a rank value for each of the one or more electronic messages based on the plurality of attributes of user interaction with the one or more electronic messages, and sorting the one or more electronic messages in the user account based on the determined rank value. The one or more electronic messages are then provided for differentiated display in accordance with the determined rank value.

In yet another aspect, the disclosed technology provides for a method for sorting electronic messages that includes receiving an indication of a plurality of attributes of user interaction with one or more electronic messages in a user account and determining a rank value for each of the one or more electronic messages based on the plurality of attributes of user interaction with the one or more electronic messages. The method then proceeds to sort the one or more electronic messages in the user account based on the determined rank value and provide the sorted one or more electronic messages for display in accordance with the determined rank value. An indication of an additional attribute of use interaction with the one or more sorted messages is received when the one or more sorted messages is provided for differentiated display. A new rank value is then determined for each of the one or more electronic messages provided for differentiated display based on the additional attribute, and finally, the one or more electronic messages is provided for display in accordance with the new determined rank value.

Another configuration of the disclosed technology provides for a machine-readable medium that includes machine-executable instructions for performing a method that includes the steps of: receiving an indication of a plurality of attributes of user interaction with one or more electronic messages in a user account, determining a rank value for each of the one or more electronic messages based on the plurality of attributes of user interaction with the one or more electronic messages, sorting the one or more electronic messages in the user account based on the determined rank value, and providing the sorted one or more electronic messages for display in accordance with the determined rank value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

A computer-implemented method is provided, according to which, an indication of a plurality of attributes of user interaction with one or more electronic messages in a user account is received, a rank value for each of the one or more electronic messages based on the plurality of attributes of user interaction with the one or more electronic messages is determined, the one or more electronic messages in the user account are sorted based on the determined rank value, and the sorted one or more electronic messages are provided for display in accordance with the determined rank value.

Figure 1:
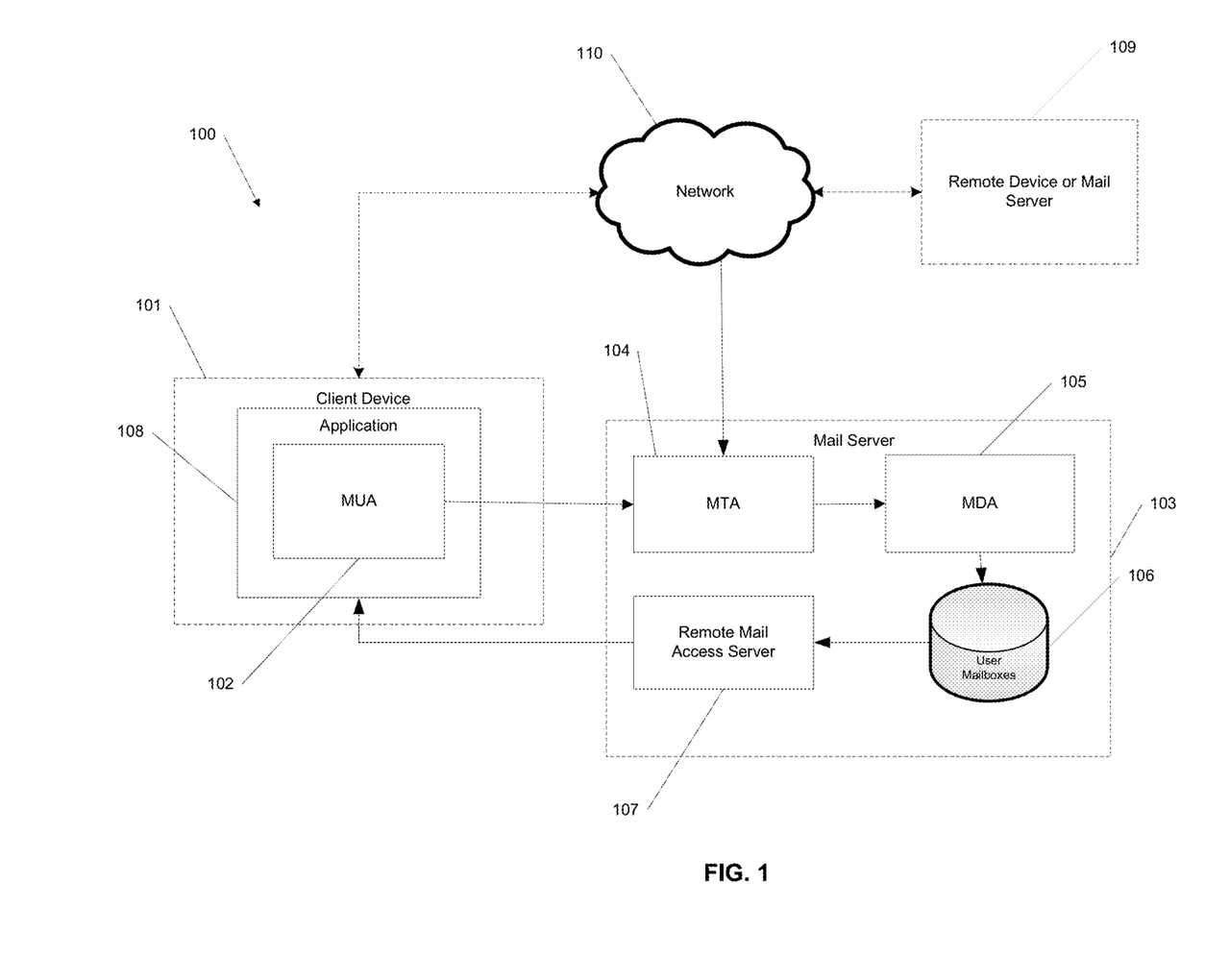
FIG. 1 is a diagram of an exemplary system for sorting electronic messages, including a client device and mail server for managing an electronic message account.

FIG. 1 is a diagram of an exemplary system for sorting electronic mail messages, including a client device and mail server for managing an electronic message account. In one aspect, a system 100 includes an electronic message service (for example, a web-based electronic message service or electronic message client), including one or more client devices 101 (for example, a personal computer, laptop or tablet computer, server, a smart phone, personal digital assistant (PDA), or the like) and one or more mail servers 102, configured for sending and receiving electronic messages and for providing one or more electronic message accounts to one or more users. A client device 101 may include a mail user agent (MUA) 102, and a mail server 103 may include a mail transport agent (MTA) 104, a mail delivery agent (MDA) 105, one or more user mailboxes 106, a remote mail access server 107, or other components for facilitating the sending or receiving of electronic messages.

MUA 102 handles tasks related to the creation and addressing of outgoing mail messages, and retrieves incoming mail messages from a mail server. MUA 102 may be included as part of an electronic message client application 108 located on client device 101. In one aspect, electronic message client application 108 may include a webmail client: an electronic message client implemented as a web application and accessed through a web browser. In this regard, electronic message client application 108 may be accessed by one or more remote client machines 109 operably connected to client device 101 over a network 110 (for example, the Internet, an internet, or other network). In another aspect, electronic message client application 108 may include a desktop electronic message client application 108 located on a client device 101, and configured to connect to mail server 103 (for example, over a network).

MTA 104, MDA 105, user mailboxes 106 and remote mail access server 107 may be part of a mail server application on mail server 102. MTA 104 may manage the process of transferring mail between computers (for example, between mail server 103 and a remote mail server 109), and MDA 105 may be responsible for delivery of electronic message to individual user mailboxes. The user mailboxes may be implemented as a local file system on a hard disk, a database, or other memory device configured for storing incoming and outgoing mail messages. The remote mail access server may provide user access through a client device 101 to mail stored in a user mailbox using a remote mail access protocol, for example, Internet Message Access Protocol (IMAP) or Post Office Protocol 3 (POP3). Although the technology is discussed in the context of email messages, it is understood that other systems capable of sending and receiving electronic messages may benefit from the present disclosure.

Figure 2A:
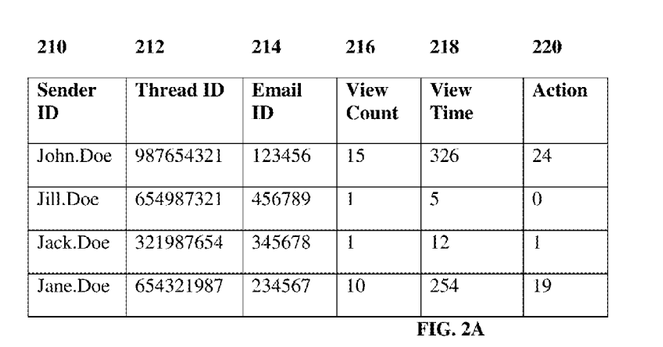
FIGS. 2A, 2B, and 2C shows a series of exemplary tables that list various data including a plurality of attributes of user interaction with an electronic message stored in a user account at various stages of the disclosed processes for sorting electronic messages.
Figure 2B:
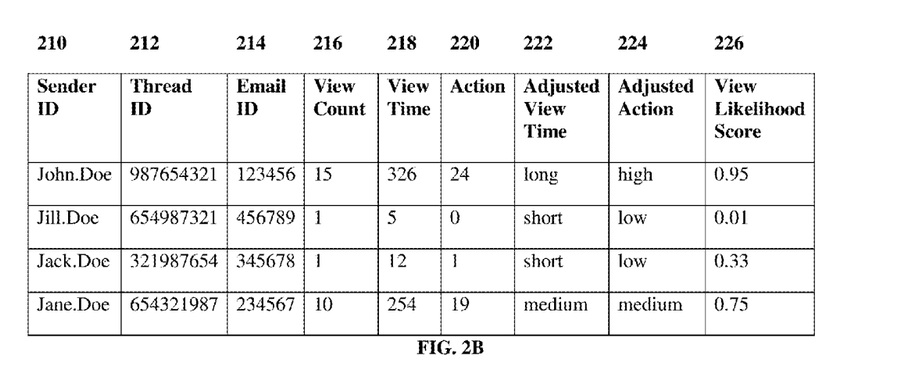
Figure 2C:
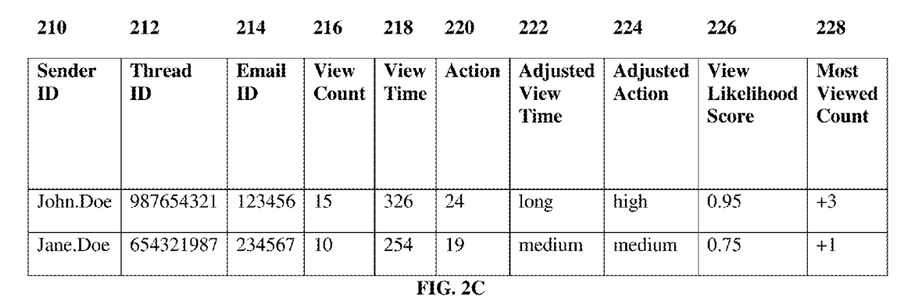

FIG. 2 shows a series of exemplary tables that list various data including a plurality of attributes of user interaction with an electronic message stored in a user account at various stages of the disclosed processes for sorting electronic messages.

FIG. 2A is an example of a table 200 that lists a plurality of attributes of user interaction stored in a user account. Various attributes of user interaction with an electronic message and other data may be stored in table 200. Sender ID 210 corresponds to the ID of the sender whose electronic message is received in the user account. Thread ID 212 corresponds to the ID of an electronic message thread for which attributes are stored in table 200. Electronic message ID 214 identifies the ID of the electronic message within an electronic message thread for which attributes are stored in table 200. View count attribute 216 corresponds to how many times an electronic message is viewed in a user's account. For example, John. Doe's electronic message 987654321.123456 may have a view count attribute 216 value of 15 when it has been viewed 15 times in the user account. Every time a user clicks to open an electronic message thread, a count will be added and stored in the view count attribute 216 column.

View time attribute 218 corresponds to a cumulative view time for an electronic message in a user account. The view time attribute 218 value may be derived from how long a user spent viewing an electronic message in one instance or across multiple instances. To estimate the view time attribute 218 value, an electronic message system may start a distinct view timer for each electronic message in a thread, when, for example, an expanded electronic message loads above the page fold on a tab that is in focus, a user expands to see an electronic message in a thread on a tab that is in focus or another similar event. The view time may be stopped by an electronic message system when, for example, the electronic message is collapsed, the electronic message is expanded but is below the page fold, the electronic message system detects that its browser tab is not in focus, or another similar event indicating that the electronic message is not in active view. A value for this attribute may be represented by, for example, a number of seconds.

An exemplary electronic message system 100 may likewise record in table 200 actions taken with respect to an electronic message. Action attribute 220 may track such events as clicking anywhere in the electronic message, scrolling through the electronic message, activating a link in the electronic message, replying to or forwarding the electronic message, highlighting text in the electronic message, labeling, flagging, or otherwise engaging the electronic message, or other similar events. Every time an action event is detected for an electronic message, the action attribute 220 value will be incremented. A threshold may be implemented for some of the action events, such that the event becomes relevant or a count for that event is incremented only after it occurs a certain, predefined number of times. For example, it may be implemented that at least two action events must be detected before the action attribute 220 count is incremented.

FIG. 2B is an example of a table 200 with computed view likelihood score 226 values for each of the listed electronic messages. In the example electronic message system 100, table 200 may further include an adjusted view time 222 value and an adjusted count 224 value that may be considered when computing the view likelihood score 226. The adjusted view time 222 value may be a derivative of the view time 218 value. It may be calculated based on a comparison of the recorded view time 218 value for a specific electronic message to the user's electronic message viewing behavior overall. Electronic message system 100 may, thus, determine whether the adjusted view time 222 for an electronic message is "short," "medium" or "long," as compared to the user's overall electronic message viewing behavior.

The adjusted count 224 value may likewise compare the number of actions on a specific electronic message in the user's account to the average number of actions per electronic message for the user. Other values in table 200 may also be adjusted to represent their significance or score in the user's overall behavior of viewing electronic messages. The adjusted values represent the result of a comparison of message-specific values to the general pattern values for a user.

In one aspect of the subject technology, components considered in calculating the view likelihood score 226 value may also be weighted. That is, some components may have a greater weight than others for the purpose of calculating the view likelihood score 226 value. For example, the adjusted action 224 component may have a weight value of 0.9, while the adjusted view time 222 component may have a lower weight of, for example, 0.6.

In calculating the view likelihood score 226 several components may be considered by an electronic message system. The calculation may be based on values already available at or computed by the electronic message system 100. For example, according to one aspect of the subject technology, the view likelihood score 226 may be calculated from the adjusted action 224 value and the adjusted view time 222 value. The value format of such components may be numbers, percentages, ranges, or other quantifiers, including designated ranges such as "short," "medium" or "long," their numerical equivalents, or other suitable formats. The final view likelihood score 226 value may be computed by summing the products of the components' weight and adjusted attribute values. The view likelihood score 226 value may be represented by ranges such as "0.0-1.0," "1-100," percentages, or other suitable representations.

After computing the view likelihood score 226 for each of the electronic messages, table 200 may be sorted by high view counts 216 and high view likelihood scores 226. Together, the view likelihood score 226 and view count 216 may help determine a rank value for any given electronic message in a user's inbox. The user's electronic messages may then be sorted according to the determined rank and provided to the user for display. For example, the electronic messages with the highest view count 216 value and view likelihood score 226 may have the highest ranks and may be provided for differentiated display, that is, be surfaced at the top of a user's inbox or copied into a "Most Viewed" section of the inbox.

FIG. 2C is an example of a table 200 after being sorted according to a rank determined from view count 216 values and view likelihood score 226 values. This version of table 200 also includes the most viewed count 228 values, which correlate to how many times the electronic messages ranked by the electronic message system 100 to be "most viewed" have been re-viewed by the user after being so ranked. If the number is positive and keeps increasing, the view likelihood score 226 may be further upwardly incremented. If, during a pre-determined period of time, a previously "most viewed" ranked electronic message has not been re-viewed, it may be removed from the "most viewed" section of the user's inbox.

Figure 3:
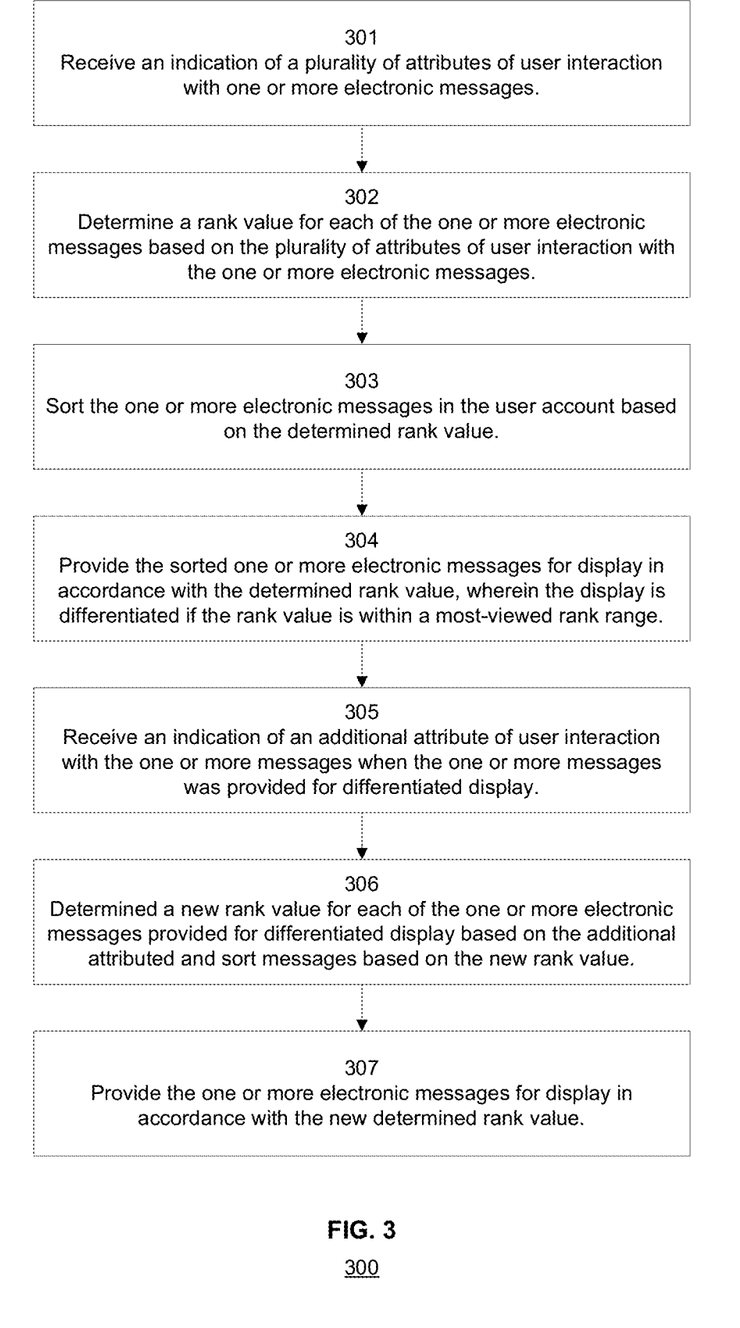
FIG. 3 shows a flowchart illustrating an exemplary process for sorting electronic messages.

FIG. 3 shows a flowchart illustrating an exemplary process 300 for sorting electronic messages. The process begins at step 301 by receiving an indication of a plurality of attributes of user interaction with one or more electronic messages. As previously discussed with reference to FIG. 2, the plurality of attributes of user interaction includes but is not limited to view count attribute 216, view time attribute 218 and action attribute 220. Some attribute values may be further processed by the electronic message system 100 to arrive at adjusted values that represent the various values' significance or score in the user's overall behavior of viewing electronic messages. The adjusted values may be a result of a comparison of message-specific values to the general pattern values for a specific user.

The raw attribute values and the adjusted values may further be compiled for a view likelihood score 226 which, together with at least one other raw or adjusted attribute value may be used by the electronic message system 100 to determine a rank value for each of the one or more electronic messages at step 302. The rank value may thus reflect the extent of user interaction with a specific message.

At step 303, the one or more electronic messages in table 200 will be sorted in a user's account according to their respective determined rank values. The result of the sorting may determine a table 200 with the messages that enjoy the highest degree of user interaction appearing at the top of the table. At step 304 of process 300, the sorted electronic messages are provided for display in the user's inbox according to their rank.

An electronic message system 100 may define a most-viewed rank range, according to which electronic messages falling into the range may be provided for differentiated display. For example, the top twenty electronic messages may be provided for differentiated display, when the rank range is "20." Differentiated display may be that the qualifying electronic messages are surfaced at the top of a user's inbox or are otherwise highlighted or featured in a user's inbox for easy access. For example, such electronic messages may also be copied and placed by the electronic message system 100 into a separate "most viewed" folder.

Further indication of interaction with electronic messages that have been selected by the electronic mail system 100 for differentiated display, or the "most-viewed" electronic messages, may be further received by the electronic mail system 100 and a most viewed count may be started for such messages upon being so displayed at step 305. To that end, an electronic message system 100 may receive an indication and store how often the respective user re-views such electronic messages. A new rank value based on the most viewed count 228 value may be determined for such electronic messages at step 306. Furthermore, such electronic messages may, again, be sorted by the electronic message system 100 in accordance with the new rank value at step 307 to assure that electronic messages that have not been re-viewed by the user are removed from differentiated display as they are no longer "most viewed." For example, if, after an electronic message was determined to be a "most-viewed" message and was selected for differentiated display, it receives a positive most viewed count 228 value, the electronic message will likely remain a "most-viewed" message. If, however, the electronic message is not re-viewed within a certain time period defined by an electronic message system 100, for example, a day or a week, then it may be removed from the most-viewed section.

Figure 4:
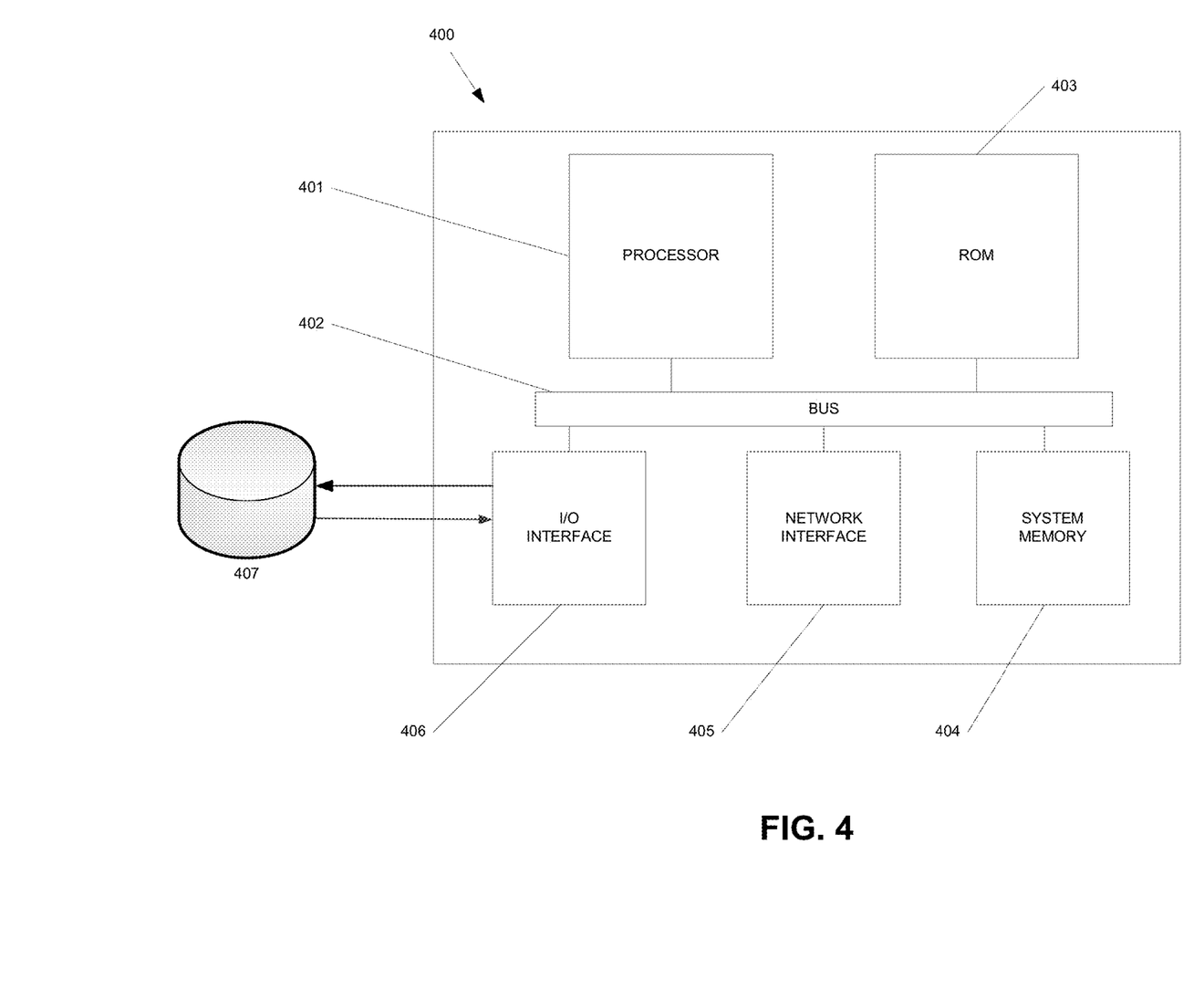
FIG. 4 is a diagram illustrating an exemplary server system for sorting electronic messages, including a processor and other internal components.

FIG. 4 is a diagram illustrating an exemplary server system for sorting electronic messages, including a processor and other internal components. In some aspects, a computerized device 400 (for example, client device 101, mail server 102, remote device or mail server 104, or the like) includes several internal components, for example, a processor 401, a system bus 402, read-only memory 403, system memory 404, network interface 405, input/output (I/O) interface 406, and the like. In one aspect, processor 401 may also be in communication with a storage medium 407 (for example, a hard drive, database, or data cloud) using I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and determine commands. Processor 401 is configured to receive an indication and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a read only memory (ROM) within processor 401. Likewise, one or more sequences of instructions may be software stored and read from system memory 405, ROM 403, or received from a storage medium 407 (for example, using I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, for example, dynamic memory used for system memory 404 or for buffers within processor 401, and non-volatile media, for example, electronic media, optical media, and magnetic media.

In some aspects, processor 401 is configured to communicate with one or more external devices (for example, using I/O interface 406). Processor 401 is further configured to read data stored in system memory 404 or storage medium 407 and to transfer the read data to the one or more external devices in response to a request from the one or more external devices. The read data may include one or more web pages or other software presentation to be rendered on the one or more external devices. The one or more external devices may include a computing system, for example, a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM), for example, double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory, for example, a magnetic disk, flash memory, peripheral solid state drive (SSD), and the like.

Input/output (I/O) interface 406 may be configured to be coupled to one or more external devices, to receive data from the one or more external devices and to send data to the one or more external devices. I/O interface 406 may include both electrical and physical connections for operably coupling I/O interface 406 to processor 401, for example, through bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, for example, Serial-Attached SCSI (SAS), Fiber Channel interface, Peripheral Component Interconnect Express (PCIe), Serial Advanced Technology Attachment (SATA), universal serial bus (USB), and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 or the internal devices operably attached thereto.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (for example, arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. Headings and subheadings, if any, are used for convenience only and do not limit the invention.

What is claimed is:

1. A computer-implemented method for sorting electronic messages, the method comprising:
   receiving an indication of a plurality of attributes of user interaction with one or more electronic messages in a user account;
   determining a rank value for each of the one or more electronic messages based on the plurality of attributes of user interaction with the one or more electronic messages;
   sorting the one or more electronic messages in the user account based on the determined rank value;
   providing the sorted one or more electronic messages for display in accordance with the determined rank value;
   receiving an indication of an additional attribute of user interaction for the sorted one or more electronic messages provided for display in accordance with the determined rank value, wherein the additional attribute corresponds to a post-display view count;
   determining, based on the additional attribute, a new rank value for each of the sorted one or more electronic messages provided for display; and
   re-sorting, based on the new determined rank value, the sorted one or more electronic messages provided for display.

2. The computer-implemented method of claim 1, wherein the plurality of attributes of user interaction includes a view count attribute corresponding to a number of times the one or more electronic messages is viewed in the user account.

3. The computer-implemented method of claim 1, wherein the plurality of attributes of user interaction includes a view time attribute corresponding to a cumulative view time for the one or more electronic messages in the user account.

4. The computer-implemented method of claim 1, wherein the plurality of attributes of user interaction includes an action attribute corresponding to actions taken on the one or more electronic messages in the user account.

5. The computer implemented method of claim 4, wherein actions taken on the one or more electronic messages include at least one of clicking, highlighting, activating a link, scrolling, replying, forwarding, labeling and flagging the electronic message.

6. The computer-implemented method of claim 1, wherein determining a rank value for each of the one or more electronic messages based on the plurality of attributes of user interaction with the one or more electronic messages further comprises calculating a view likelihood score.

7. The computer-implemented method of claim 6, wherein the rank value is based on the view likelihood score and at least one attribute from the plurality of attributes of user interaction with the one or more electronic messages.

8. The computer-implemented method of claim 1, wherein providing the sorted one or more electronic messages for display in accordance with the determined rank value, further comprises providing the sorted one or more electronic messages for differentiated display when the determined rank value is within a most-viewed rank range.

9. The computer implemented method of claim 8, further comprising:
   upon providing the sorted one or more electronic messages for differentiated display, receiving an indication of an additional attribute of user interaction with the one or more messages.

10. The computer-implemented method of claim 9, wherein the additional attribute corresponds to a post-differentiated display view count.

11. The computer-implemented method of claim 9, further comprising:
   determining a new rank value based on the additional attribute for each of the one or more electronic messages provided for differentiated display.

12. The computer-implemented method of claim 11, further comprising:
   sorting the one or more electronic messages provided for differentiated display based on the new determined rank value.

13. The computer-implemented method of claim 11, further comprising:
   providing the sorted one or more electronic messages for display in accordance with the new determined rank value.

14. A computer-implemented method for sorting electronic messages, the method comprising:
   receiving an indication of a plurality of attributes of user interaction with one or more electronic messages in a user account;
   determining a rank value for each of the one or more electronic messages based on the plurality of attributes of user interaction with the one or more electronic messages;
   sorting the one or more electronic messages in the user account based on the determined rank value;
   providing the sorted one or more electronic messages for differentiated display in accordance with the determined rank value;
   receiving an indication of an additional attribute of user interaction for the sorted one or more electronic messages provided for differentiated display in accordance with the determined rank value, wherein the additional attribute corresponds to a post-differentiated display view count;
   determining, based on the additional attribute, a new rank value for each of the sorted one or more electronic messages provided for differentiated display; and
   re-sorting, based on the new determined rank value, the sorted one or more electronic messages provided for differentiated display.

15. The computer-implemented method of claim 14, wherein the plurality of attributes of user interaction includes a view count attribute corresponding to a number of times the one or more electronic messages is viewed in the user account.

16. The computer-implemented method of claim 14, wherein the plurality of attributes of user interaction includes a view time attribute corresponding to a cumulative view time for the one or more electronic messages in the user account.

17. The computer-implemented method of claim 14, wherein the plurality of attributes of user interaction includes an action attribute corresponding to actions taken on the one or more electronic messages in the user account.

18. The computer implemented method of claim 17, wherein actions taken on the one or more electronic messages include at least one of clicking, highlighting, activating a link, scrolling, replying, forwarding, labeling and flagging the electronic message.

19. The computer-implemented method of claim 14, wherein determining a rank value for each of the one or more electronic messages based on the plurality of attributes of user interaction with the one or more electronic messages further comprises calculating a view likelihood score.

20. The computer-implemented method of claim 19, wherein rank value is based on the view likelihood score and at least one attribute from the plurality of attributes of user interaction with the one or more electronic messages.

21. The computer-implemented method of claim 14, wherein providing the sorted one or more electronic messages for differentiated display in accordance with the determined rank value further comprises:
   providing the sorted one or more electronic messages for differentiated display when the determined rank value is within a most-viewed rank range.

22. A computer-implemented method for sorting electronic messages, the method comprising:
   receiving an indication of a plurality of attributes of user interaction with one or more electronic messages in a user account;
   determining a rank value for each of the one or more electronic messages based on the plurality of attributes of user interaction with the one or more electronic messages;
   sorting the one or more electronic messages in the user account based on the determined rank value;
   providing the sorted one or more electronic messages for display in accordance with the determined rank value;
   receiving an indication of an additional attribute of user interaction with the one or more messages when the one or more sorted messages was provided for differentiated display;
   determining a new rank value for each of the one or more electronic messages provided for differentiated display based on the additional attribute; and
   providing the one or more electronic messages for display in accordance with the new determined rank value.

23. The computer-implemented method of claim 22, wherein the additional attribute corresponds to a post-differentiated display view count.

24. A non-transitory machine readable medium including machine-executable instructions stored therein, which when executed by a machine, cause the machine to perform operations comprising:
   receiving an indication of a plurality of attributes of user interaction with one or more electronic messages in a user account;
   determining a rank value for each of the one or more electronic messages based on the plurality of attributes of user interaction with the one or more electronic messages;
   sorting the one or more electronic messages in the user account based on the determined rank value; and
   providing the sorted one or more electronic messages for display in accordance with the determined rank value;
   receiving an indication of an additional attribute of user interaction for the sorted one or more electronic messages provided for display in accordance with the determined rank value, wherein the additional attribute corresponds to a post-display view count;

determining, based on the additional attribute, a new rank value for each of the sorted one or more electronic messages provided for display; and re-sorting, based on the new determined rank value, the sorted one or more electronic messages provided for display.

\* \* \* \* \*